US008964034B2

(12) United States Patent
Nagamine et al.

(10) Patent No.: US 8,964,034 B2
(45) Date of Patent: Feb. 24, 2015

(54) VEHICLE SURROUNDINGS AWARENESS SUPPORT DEVICE

(75) Inventors: Noboru Nagamine, Anjo (JP); Kazuya Watanabe, Anjo (JP); Tomoyuki Matsuba, Anjo (JP); Jun Kadowaki, Kariya (JP); Toshihiro Mori, Okazaki (JP); Yuuichi Ooshita, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 435 days.

(21) Appl. No.: 13/388,849

(22) PCT Filed: Jul. 28, 2010

(86) PCT No.: PCT/JP2010/062657
§ 371 (c)(1),
(2), (4) Date: Feb. 3, 2012

(87) PCT Pub. No.: WO2011/016367
PCT Pub. Date: Feb. 10, 2011

(65) Prior Publication Data
US 2012/0133769 A1  May 31, 2012

(30) Foreign Application Priority Data
Aug. 4, 2009  (JP) ................................. 2009-181721

(51) Int. Cl.
*H04N 9/47* (2006.01)
*B62D 15/02* (2006.01)
(Continued)

(52) U.S. Cl.
CPC ............. *B62D 15/0275* (2013.01); *B60R 1/00* (2013.01); *G08G 1/166* (2013.01); *G08G 1/168* (2013.01);
(Continued)

(58) Field of Classification Search
CPC .................................. B60R 1/00; H04N 7/181
See application file for complete search history.

(56) References Cited

U.S. PATENT DOCUMENTS 5,777,690 A  7/1998 Takeda et al.
5,923,365 A  7/1999 Tamir et al.
(Continued)

FOREIGN PATENT DOCUMENTS

EP   1 642 808 A1   4/2006
JP   8-194822 A     7/1996
(Continued)

OTHER PUBLICATIONS

International Preliminary Report on Patentability for PCT/JP2010/062657 dated Mar. 22, 2012.
(Continued)

*Primary Examiner* — Dave Czekaj
*Assistant Examiner* — Nam Pham
(74) *Attorney, Agent, or Firm* — Sughrue Mion, PLLC

(57) ABSTRACT

Provided is a vehicle surroundings awareness support device capable of providing a prompt for a driver to intuitively direct their attention, without the driver feeling hassled. Captured images comprising a plurality of frames taken sequentially by an onboard camera for imaging the surroundings of the vehicle are received; an optical flow is computed on the basis of feature points contained in the plurality of frames imaged at different times; moving objects in the surroundings of the vehicle are detected on the basis of the optical flow; and a display for showing movement trajectories for the moving objects is superimposed on the captured images on the basis of the optical flow.

4 Claims, 7 Drawing Sheets

(51) Int. Cl.
*B60R 1/00* (2006.01)
*G08G 1/16* (2006.01)
*G06T 7/20* (2006.01)

(52) U.S. Cl.
CPC ......... *G06T 7/2033* (2013.01); *B60R 2300/305* (2013.01); *B60R 2300/307* (2013.01); *B60R 2300/8033* (2013.01); *B60R 2300/806* (2013.01); *B60R 2300/8086* (2013.01); *G06T 2207/30261* (2013.01)
USPC ...................................................... 348/148

(56) References Cited

U.S. PATENT DOCUMENTS

| | | | | |
|---|---|---|---|---|
| 8,098,173 | B2 * | 1/2012 | Hueppauff et al. | 340/932.2 |
| 2003/0210807 | A1 * | 11/2003 | Sato et al. | 382/104 |
| 2006/0069478 | A1 | 3/2006 | Iwama | |
| 2006/0284976 | A1 | 12/2006 | Girgensohn et al. | 348/135 |
| 2007/0248244 | A1 * | 10/2007 | Sato et al. | 382/103 |
| 2007/0253596 | A1 | 11/2007 | Murata et al. | |
| 2009/0174575 | A1 * | 7/2009 | Allen et al. | 340/933 |
| 2009/0322915 | A1 * | 12/2009 | Cutler | 348/251 |

FOREIGN PATENT DOCUMENTS

| | | |
|---|---|---|
| JP | 2000-187478 A | 7/2000 |
| JP | 3239521 B2 | 12/2001 |
| JP | 2003-208602 A | 7/2003 |
| JP | 2004-56763 A | 2/2004 |
| JP | 2005-123968 A | 5/2005 |
| JP | 2005-132170 A | 5/2005 |
| JP | 2007-280043 A | 10/2007 |
| WO | 95/10915 A1 | 4/1995 |

OTHER PUBLICATIONS

Extended European Search Report, dated May 28, 2014, issued in European Patent Application No. 10806366.0.
International Search Report for PCT/JP2010/062657 dated Sep. 7, 2010.

* cited by examiner

VEHICLE SURROUNDINGS AWARENESS SUPPORT DEVICE

CROSS REFERENCE TO RELATED APPLICATIONS

This application is a National Stage of International Application No. PCT/JP2010/062657 filed Jul. 28, 2010, claiming priority based on Japanese Patent Application No. 2009-181721 filed Aug. 4, 2009, the contents of all of which are incorporated herein by reference in their entirety.

TECHNICAL FIELD

The present invention relates to an awareness support technology capable of providing a prompt for a driver to intuitively direct his attention to an object requiring a safety check in the vehicle surroundings, without the driver feeling hassled.

BACKGROUND ART

It is important that a driver, when driving a vehicle, check the circumstances of the vehicle surroundings, for example, for the existence or approach toward the vehicle of a person, other objects, or the like. In recent years, there have been implemented driving support devices and vehicle surroundings monitoring devices, in which a camera is installed in the vehicle and captured images are displayed on an on-board monitor device, whereby such a check is assisted. Sensors using ultrasound, radar, or the like are used to detect persons or objects approaching the vehicle in the vehicle surroundings. Also known is a technology for differentiating between stationary objects and moving objects and recognizing moving objects by image processing.

The principle of optical flow is often applied to moving object recognition employing image processing. For example, U.S. Pat. No. 5,777,690 (PTL 1) discloses a technology for analyzing temporal position changes of the vanishing point of the optical flow (the "focus of expansion," or FOE), the appearance of a moving object being detected when the position changes a predetermined amount or more (column 7, line 58 to column 8, line 27, et al.). JP 2005-123968A (PTL 2) discloses a technology for providing a driver with notifications on the basis of the results of detection using optical flow, by providing a box around a moving object in an image or by emitting a warning sound or audio message ([0013] to [0019], and so forth).

Indicating in an image or emitting a warning sound or audio message to notify the driver of the presence of a moving object or the approach thereof toward their vehicle is likely to cause the driver to feel hassled. The driver may also feel hassled in cases in which the presence of a moving object or approach thereof toward their vehicle is detected in error. The monitor device or the like provided onboard the vehicle, although assuredly intended to assist with driving, is preferably used expressly for assistance purposes. It is desirable for the driver, when driving, to perform a check using his own five senses, and particularly by direct visual contact.

CITATION LIST

Patent Literature

[PTL 1] U.S. Pat. No. 5,777,690
[PTL 2] JP2005-123968A

SUMMARY OF INVENTION

In view of the background described above, a need has existed for a technology for vehicle surroundings awareness support, capable of providing a prompt for a driver to intuitively direct their attention to an object requiring a safety check in the vehicle surroundings, without the driver feeling hassled.

A first aspect of the vehicle surroundings awareness support device according to the present invention, made in view of the foregoing problems, lies in being provided with:

an image reception unit for receiving captured images comprising a plurality of frames taken sequentially by an onboard camera for imaging the surroundings of the vehicle;

an optical flow computation unit for computing an optical flow on the basis of feature points contained in the plurality of the frames imaged at different times;

a moving object detection unit for detecting moving objects in the surroundings of the vehicle on the basis of the optical flow; and a superimposing unit for superimposing a display for showing movement trajectories for the moving objects onto the captured images, on the basis of the optical flow.

Optical flow is a movement vector of a moving object; therefore, a movement trajectory superimposed onto a captured image on the basis of the optical flow will provide a favorable representation of the movement of the moving object. The dynamics of the moving object are indicated on the captured image according to the movement trajectory, and the driver can therefore sense the dynamics thereof. A warning sound or audio message is not used to alert the driver to the presence of a moving object, nor is the presence of the moving object expressly indicated in the image by a box or the like, and therefore the driver will not feel hassled. Specifically, according to the present aspect, there can be provided a prompt for a driver to intuitively direct their attention to an object requiring a safety check in the vehicle surroundings, without feeling hassled.

The vehicle surroundings awareness support device according to the present invention preferably further includes an afterimage generation unit for setting an image region containing at least some of the pixels constituting the moving object as a designated image region in a designated frame, which is one of the frames constituting the captured images, and for generating an afterimage using the pixels of the designated image region, wherein the superimposing unit imparts the frames following the designated frame with predetermined weightings and superimposes the afterimage thereon.

An afterimage is created even in ordinary captured images in a case in which an object with rapid movement is captured. An afterimage may sometimes even be perceived by the naked eye. An afterimage therefore typically suggests a rapidly moving object. An afterimage does not occur in a case in which ordinary images of a person, automobile, or other ordinary moving object are taken at a rate of about 15 to 30 frames per second. In other words, there are few opportunities to see or perceive an afterimage in ordinary captured images. Conversely, artificially generating an afterimage and superimposing same on a captured image makes it possible to convey the presence of a moving object to a driver who sees the captured image or is capable of seeing (catching sight of) the captured image. The afterimage corresponds to the trajectory of the moving object, and therefore the driver can instantly grasp the presence of the moving object and the direction and trajectory in which the moving object moves. The ability to instantly grasp the movement of the moving object allows the vehicle surroundings to be efficiently checked without the need to stare solely at the monitor.

The superimposing unit of the vehicle surroundings awareness support device according to the present invention preferably superimposes a visualized form of the optical flow onto the captured images.

The optical flow, being a movement vector of a moving object, therefore serves as an auxiliary line for indicating movement when the optical flow is visualized. Superimposing the auxiliary line onto the captured images makes it possible to indicate by direct representation the movement of a moving object, as with auxiliary lines for representing movement in, for example, cartoons or artwork.

The vehicle surroundings awareness support device according to the present invention preferably further includes a parking target setting unit for setting a parking target for parking the vehicle, wherein the moving object detection unit detects the moving object on the basis of the optical flow directed toward at least one of either the parking target or a planned course of the vehicle to the parking target, and wherein the superimposing unit superimposes a display for indicating the movement trajectory of the moving object onto the captured image.

In some cases, when all the moving objects on the captured image are detected and the movement trajectories are superimposed thereon, the captured image is made more complex by the superimposed movement trajectories. For example, a moving object that would be a problem during a parking operation is a moving object that encroaches on the course of the vehicle or a moving object that has the potential to do so. In a case in which a parking target is set, the course of the vehicle is a path directed toward the parking target. Therefore, a moving object that is directed toward the parking target is highly likely to be a moving object that encroaches on the movement path of the vehicle or a moving object that has the potential to do so. The planned course of the vehicle is a path by which the vehicle is directed toward the parking target. Further, in some cases in a simple backward movement operation or the like, no parking target will be set, and the planned course is computed merely according to the angle of rotation of the steering. A moving object directed toward such a planned course presumably has a high probability of encroaching into the movement path of the vehicle. Therefore, detecting a moving object on the basis of an optical flow directed toward a parking target or planned course allows for the achievement of an appropriate vehicle surroundings awareness support device for suppressing excessive detection of moving objects and excessive superimposing of movement trajectories while also reliably superimposing a movement trajectory that pertains to a moving object requiring detection.

Preferably, the moving object detection unit of the vehicle surroundings awareness support device according to the present invention detects the moving object on the basis of the optical flow directed toward an expected course, the course being set according to the positional relationship with the vehicle, and the superimposing unit superimposes a display for indicating the movement trajectory of the moving object onto the captured image.

To provide improved convenience for the driver, an extension line of the vehicle width and/or a distance guide line from the rear end of the vehicle is in some cases superimposed on the captured image as an expected course depending on the positional relationship with the vehicle, regardless of the parking target or planned course. Such an expected course is not limited to being during a parking operation, and is in some cases also superimposed during a simple backward movement operation or the like. The expected course roughly matches the course of the vehicle when near the vehicle. The possibility of there being contact between the vehicle and a moving object increases closer to the vehicle. According to this configuration, a moving object is detected on the basis of an optical flow oriented toward the expected course, and a display for indicating the movement trajectory of the corresponding moving object is superimposed. Therefore, an appropriate vehicle surroundings awareness support device for preventing excessive detection of moving objects and excessive superimposing of movement trajectories while also reliably superimposing a movement trajectory that pertains to a moving object requiring detection can be achieved. Further, according to this configuration, because the expected course is set merely depending on the positional relationship with the vehicle, there is no need to compute a parking target or planned course, and it becomes possible to apply the vehicle surroundings awareness support device to a wide range of vehicles.

DESCRIPTION OF EMBODIMENTS

Figure 1:
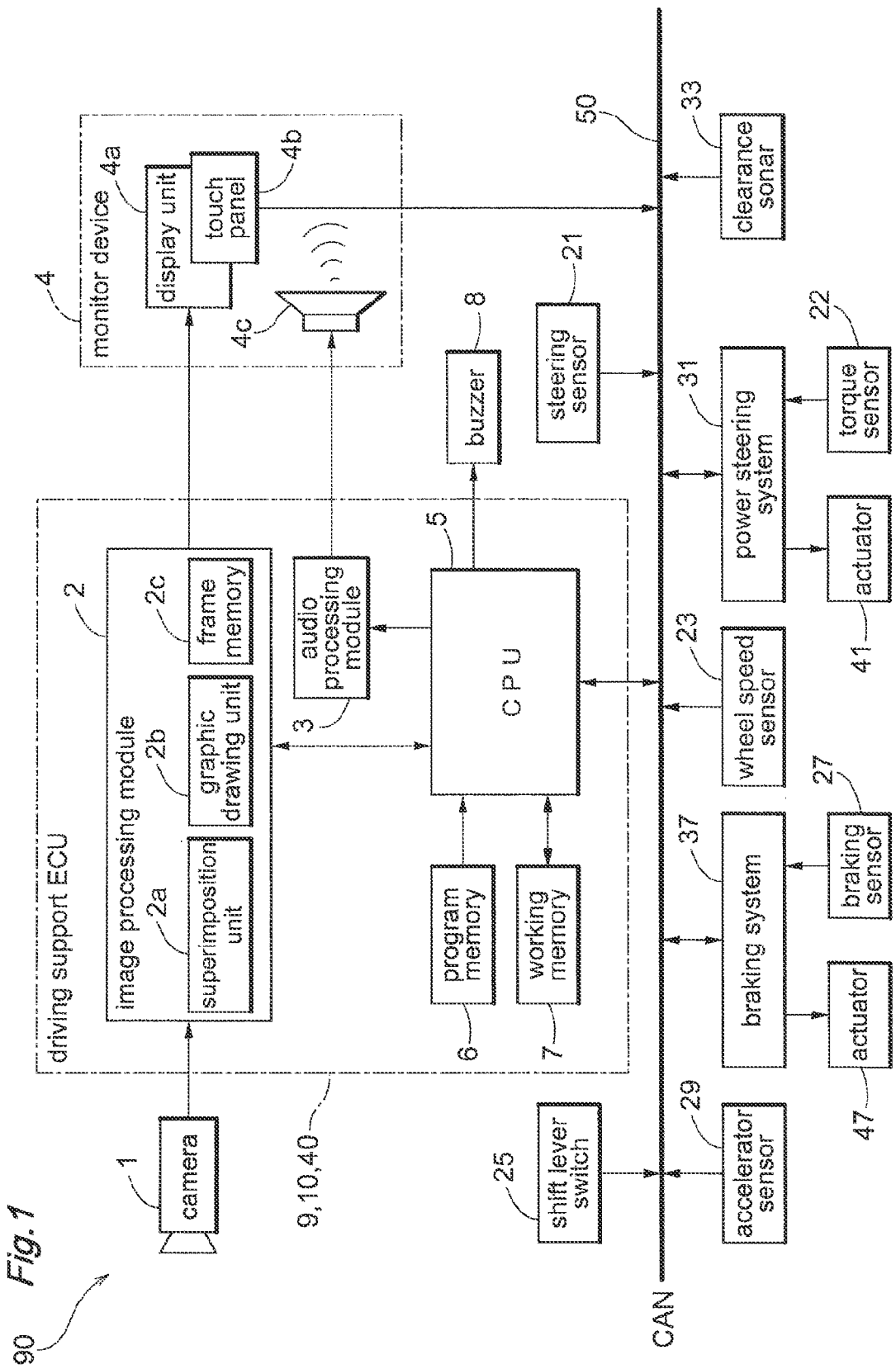
FIG. 1 is a block diagram providing a schematic illustration of an example of the system configuration of a vehicle.

The following is a description, based on the accompanying drawings, of an embodiment in which the vehicle surroundings awareness support device of the present invention is applied to a parking support device. FIG. 1 is a block diagram providing a schematic illustration of an example of the system configuration of a vehicle 90 in which such a parking support device 40 is installed. The parking support device 40 is provided with a central processing unit (CPU) 5 for performing image recognition, course prediction, or other advanced computational processing, which is responsible for the core of the parking support device 40. The CPU 5 employs a program or parameter stored in a program memory 6 to execute various forms of computational processing. The CPU 5 also temporarily stores captured images in a working memory 7, according to need, to execute computation. The program memory 6 and working memory 7 are, in the example illustrated herein, memory that is distinct from the CPU 5, but may also be integrated into the same packaging as the CPU 5. The parking support device 40 is, together with the CPU 5, the memory, and the other surrounding circuits, configured as a driving support electronic control unit (ECU) 9. In this example, the CPU 5 serves as the core, but the parking support device 40 may also be configured to have other logic computation processor, such as a digital signal processor (DSP), or logic circuit as the core.

As illustrated in FIG. 1, an image taken by a camera 1 (an onboard camera) is displayed on a monitor device 4 via an image processing module 2 having a superimposition unit 2a, a graphic drawing unit 2b, a frame memory 2c, and the like. The camera 1 is a digital camera using a charge coupled device (CCD), a CMOS image sensor (CIS), or other imaging element to sequentially take two-dimensional images at 15 to 30 frames per second and perform digital conversion to output video data (captured images). Two-dimensional images of each of the frames are stored in the frame memory 2c, and image processing and/or graphic superimposing can be performed for each individual frame. An instruction sent the graphic drawing unit 2b to draw, or an instruction sent the superimposition unit 2a to superimpose a graphic is sent from the CPU 5.

The monitor device 4 has a dual function as, for example, a monitor device for a navigation system. As illustrated in FIG. 1, the monitor device 4 has a display unit 4a, a touch panel 4b formed on the display unit 4a, and a speaker 4c. The display unit 4a displays the captured images of the camera 1 and/or graphic images supplied from the image processing module 2, or synthesized images or the like formed by synthesizing the same. As one example, the display unit 4a is composed of a liquid crystal display. The touch panel 4b is a pressure-sensitive and/or electrostatic instruction input device formed on the display unit 4a, by which the position of contact with a finger or the like can be outputted as location data. The example illustrated in FIG. 1 is a case in which the speaker 4c is provided to the monitor device 4, but the speaker 4c may also be provided to the inner side of a door or to another place. The speaker 4c outputs audio supplied from an audio processing module 3 in accordance with the instruction of the CPU 5. The CPU 5, in some cases, simply chimes with a notification sound through a buzzer 8.

The CPU 5 is connected so as to be able to communicate with various systems or sensors through an in-vehicle network identified by the reference numeral 50 in FIG. 1. In the example illustrated in this embodiment, the in-vehicle network is a controller area network (CAN) 50. As illustrated in FIG. 1, the parking support device 40 (CPU 5) is connected with an in-vehicle power steering system 31 and braking system 37. Each of these systems, similarly with respect to the parking support device 40, is configured to have a CPU or other electric circuit as the core, and, similarly with respect to the driving support ECU 9, configured to have an ECU together with the surrounding circuits.

The power steering system 31 is an electric power steering (EPS) system or a steer-by-wire (SBW) system. In the system, an assist torque is applied by an actuator 41 to the steering wheel operated by the driver, and automatic steering is performed by using the actuator 41 to actuate the steering wheel. The braking system 37 is an anti-lock braking system (ABS) for preventing the brakes from locking, an anti-skid brake device (an "electronic stability control," or ESC) for preventing the vehicle from skidding when cornering, an electric brake system having a brake assist or the like for enhancing braking power, or a brake-by-wire (BBW) system. The system is capable of applying braking force to the vehicle 90 through the actuator 47.

In FIG. 1, as one example of the various sensors, a steering sensor 21, a wheel speed sensor 23, a shift lever switch 25, and an accelerator sensor 29 are connected to the CAN 50. The steering sensor 21 is a sensor for detecting the amount that the steering wheel is steered (the angle of rotation), and is configured to use, for example, a Hall element or the like. The parking support device 40 obtains from the steering sensor 21 the amount that the steering wheel is steered by the driver or the amount of steering during automatic steering, and executes various types of control.

The wheel speed sensor 23 is a sensor for detecting the amount that the wheels rotate and the number of rotations per unit time of the vehicle 90, and is configured to use, for example, a Hall element or the like. The parking support device 40 computes the amount that the vehicle 90 moves or the like on the basis of the information obtained from the wheel speed sensor 23, and executes various types of control. The wheel speed sensor 23, in some cases, is provided to the braking system 37. The braking system 37 detects that the brakes are locking, that the wheels are spinning idly, or that there are signs of skidding or other events from rotational differences between the left and right wheels or the like, and executes various types of control. In a case in which the wheel speed sensor 23 is provided to the braking system 37, the parking support device 40 obtains the information through the braking system 37. The braking sensor 27 is a sensor for detecting the amount that the brake pedal is operated, and the parking support device 40 obtains the information through the braking system 37. The parking support device 40 is capable of performing a control so as to interrupt or discontinue automatic steering, where, for example, a case in which the brake pedal is depressed during automatic steering signifies that the environment is unsuitable for automatic steering.

The shift lever switch 25 is a sensor or switch for detecting the position of a shift lever, and is configured to use a displacement sensor or the like. The parking support device 40 is capable of, for example, initiating support control in a case in which the shift is positioned in reverse or terminating support control in a case in which the shift is changed out of reverse into a forward gear.

A torque sensor 22 for detecting the torque of the operation of the steering wheel is capable of detecting whether or not the driver is holding onto the steering wheel. The parking support device 40 is capable of performing a control so as to interrupt or discontinue automatic steering in a case such as when the driver holds on tightly during automatic steering in order to operate the steering wheel, signifying that the environment is unsuitable for automatic steering. Typically, creeping of the vehicle 90 due to the engine idling is utilized during automatic steering. Therefore, in a case in which the accelerator sensor 29 detects that the driver has operated the accelerator, the parking support device 40 is capable of performing a control so as to interrupt or discontinue automatic steering, given that the environment is unsuitable for automatic steering.

The various systems and sensors illustrated in FIG. 1 and the modes for connecting same are given by way of example; other configurations or modes of connection may also be utilized. As described above, the sensors may be connected to the CAN 50 directly, or may be connected through various systems.

As described above, the parking support device 40 is configured to have a CPU 5 as the core, and cooperates with the program (software) stored in the program memory 6 to execute various computations for parking support. There are various examples of parking support, such as:

(1) merely having a video of the rear of the vehicle projected on a monitor installed inside the vehicle;

(2) additionally displaying a superimposed vehicle width extension line, a planned course line, or other guide line;

(3) setting a parking target and instructing and guiding the driving operation of the driver using audio or the like; and (4) additionally providing guidance to the parking target by automatic steering, the driver being responsible only for adjusting speed.

In (3) and (4), the parking target is set; various techniques also exist for setting the parking target. For example:

(a) setting a predetermined position from the vehicle as the initial position of the parking target on the basis of the stopped position of the vehicle when the parking support is initiated;

(b) detecting and automatically recognizing a free space using sonar (a clearance sonar 33) or the like to set the parking target once a parking target position has been passed;

(c) using image recognition of, for example, parking space bordering to set the parking target; or the like.

In the case of any of (a) to (c), it is often possible to fine-tune the parking target using a manual operation performed by the driver.

During a parking operation, the attention of the driver tends to be comparatively focused on the parking target. The same is true when the above-described parking support is executed. There is accordingly the potential for decreased attention to a moving object approaching his own vehicle 90, e.g., another vehicle or bicycle, a pedestrian, or the like. For this reason, there is a need for a technology for notifying the driver of the presence or approach of a moving object. However, providing an explicit notification has the potential to cause the driver to feel hassled, and a case in which the presence of a moving object or the approach thereof to the vehicle is detected in error has the potential to cause the driver to feel further hassled. It is therefore preferable to provide a prompt for the driver to intuitively direct their attention to the designated object without feeling hassled. In this embodiment, the vehicle surroundings awareness support device 10 is also provided in order to support the "perception" of the driver of the presence of a moving object or the approach thereof to his vehicle by the senses of his own body, in particular by the sense of sight. The senses of the driver referred to herein also include a sixth sense, which is obtained through the sense of sight, which is one of the five senses.

In this embodiment, similarly with respect to the parking support device 40, the vehicle surroundings awareness support device 10 (hereinafter abbreviated to "awareness support device 10" as appropriate) is also configured to have the central processing unit (CPU) 5 as the core. It will be appreciated that the configuration may also use a separate CPU or memory. The CPU 5 is also not limited to a single-core, single-task processor, and may also be a multi-core, multi-task processor. This embodiment illustrates an example of a configuration in which both the parking support device 40 and the awareness support device 10 are provided. However, there may also be provided together with the awareness support device 10 only a monitor system for causing the monitor device 4 to display the captured images of the camera 1. Also, either one of the parking support device 40 and the awareness support device 10 may be included. In particular, as in this embodiment illustrated in FIG. 1, in a case in which the parking support device 40 and the awareness support device 10 are configured as the driving support ECU 9 having a shared CPU 5 as the core, it will be readily understood that there is no need to strictly differentiate between the two.

Figure 2:
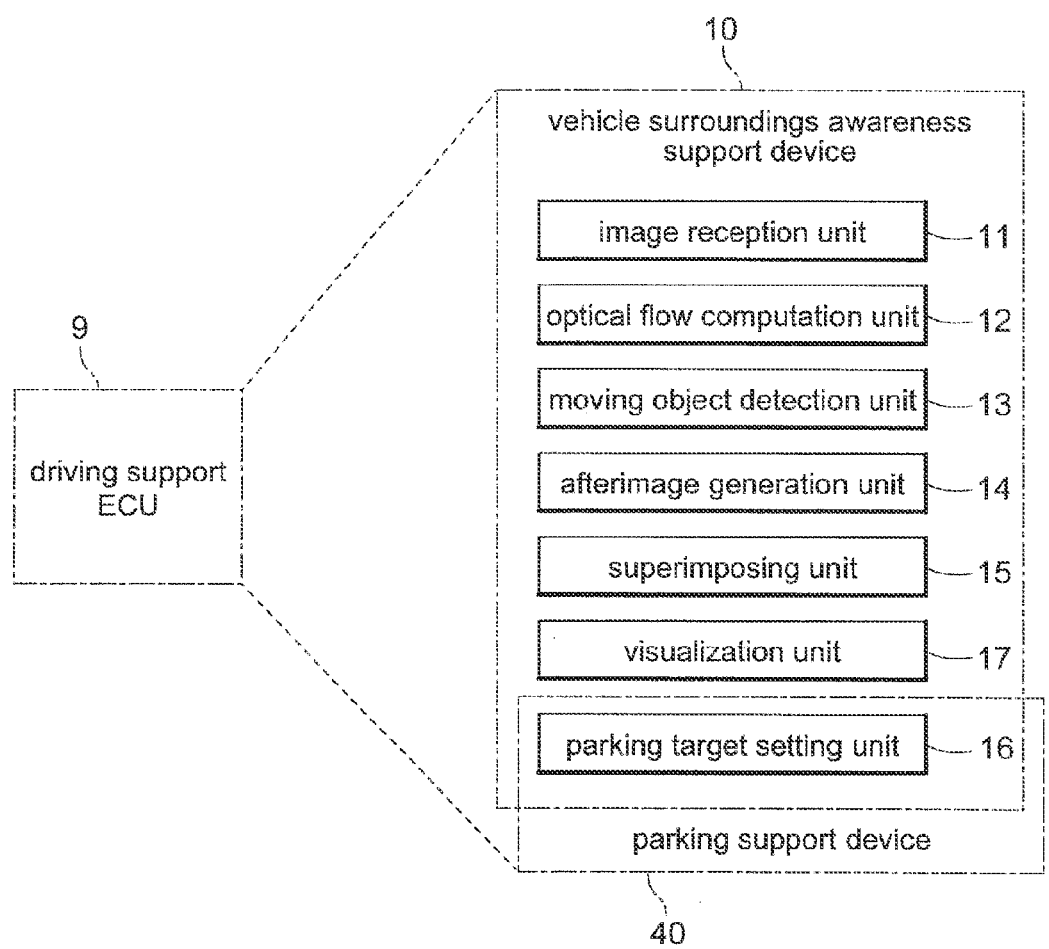
FIG. 2 is a block diagram providing a schematic illustration of an example of the functional configuration of the vehicle surroundings awareness support device.

As illustrated in FIG. 2, the awareness support device 10 is provided with an image reception unit 11, an optical flow computation unit 12, a moving object detection unit 13, an afterimage generation unit 14, a superimposing unit 15, and other various functional units. Herein, when the awareness support device 10 and the parking support device 40 are strictly differentiated, the parking target setting unit 16 belongs to the parking support device 40. Therefore, the awareness support device 10 may be configured to be provided with a parking target obtainment unit for obtaining information on the parking target from the parking target setting unit 16 of the parking support device 40. In this embodiment, because the parking support device 40 and the awareness support device 10 are composed of the shared CPU 5, the two may share the same functional units, as illustrated in FIG. 2. From this standpoint, in the following description, the awareness support device 10 is provided with the parking target setting unit 16.

The image reception unit 11 is a functional unit for receiving the captured images comprising a plurality of frames taken sequentially by the camera 1 for taking images of the surroundings of the vehicle. The image reception unit 11 is configured to have the image processing module 2 as the core. The working memory 7 in which the frames that are designated for image processing by the CPU 5 are temporarily stored also functions as the image reception unit 11. It will be appreciated that the CPU 5 and the program memory 6 for adjusting the timing by which the images are received, selecting the images that are received, and the like also function as the image reception unit 11.

The optical flow computation unit 12 is a functional unit for computing an optical flow, which is a movement vector, on the basis of feature points contained in the plurality of frames taken at different times. The moving object detection unit 13 is a functional unit for detecting a moving object in the surroundings of the vehicle 90 on the basis of the optical flow as computed by the optical flow computation unit 12. The afterimage generation unit 14 is a functional unit for setting an image region containing at least a part of the pixels constituting the moving object as a designated image region in a designated frame, which is one of the frames constituting the captured images, and for generating an afterimage using the pixels of the designated image region. The optical flow computation unit 12, the moving object detection unit 13, and the afterimage generation unit 14 are configured to have the CPU 5 and the program memory 6 as the core. It will be appreciated that the working memory 7 in which the image data of the frames designated for computation are temporarily retained also functions as such functional units.

The superimposing unit 15 is a functional unit for superimposing a display for indicating the movement trajectory of a moving object onto the captured image on the basis of the optical flow. Herein, the display for indicating the movement trajectory of the moving object is, for example, an afterimage generated by the afterimage generation unit 14, or a form of the optical flow that has been pictorially represented (visualized) by the afterimage generation unit 14 or a visualization unit 17 so as to be in a state allowing for a visual check. For example, in a case in which the display for indicating the movement trajectory of the moving object is an afterimage, the superimposing unit 15 imparts a predetermined weighting in at least one of the frames following the frame targeted during afterimage generation, and superimposes the afterimage thereon. The afterimage is superimposed onto the same coordinates as the coordinates of the designated image region of the frame on which generation is based. An image of the moving object in an image that has been previously taken is thereby displayed together with the actual image of the moving object; therefore, the dynamics (i.e., movement) are represented. In a case in which the display for indicating the movement trajectory of the moving object is a pictorial form of the optical flow, the effect exerted will be similar to that of the auxiliary line for indicating movement in cartoons, artwork, or like, and the movement of the moving object will be represented. The superimposing unit 15 and the visualization unit 17 are implemented by the CPU 5, the program memory 6, the working memory 7, the superimposition unit 2a, the graphic drawing unit 2b, and the like.

The parking target setting unit 16 is a function unit for setting the parking target where the vehicle 90 is to be parked. As described above, in a case in which a predetermined position from the vehicle 90 is set as the initial position of the parking target on the basis of the stopped position of the vehicle 90 when the parking support is initiated, the parking target setting unit 16 is configured to have the CPU 5, the program memory 6, or the like as the core. In a case in which a free space is detected and automatically recognized and the parking position is set when the vehicle 90 has passed a parking spot, the parking target setting unit 16 is configured by cooperation of the CPU 5, the program memory 6, or the like with the wheel speed sensor 23, the clearance sonar 33, and the other various sensors. In a case in which parking space bordering is recognized from an image taken by the camera 1 and the parking target is set, the parking target setting unit 16 is configured to have the CPU 5, the program memory 6, the working memory 7, or the like as the core. The various technologies adapted to set the parking target are publicly known and therefore a detailed description thereof has been omitted herein.

In a case in which the parking target is clear, the moving object detection unit 13 preferably detects a moving object on the basis of an optical flow directed toward the parking target. When there is an attempt to park the vehicle 90, the most problematic moving object is one that approaches the course of the vehicle 90. A variety of optical flows can appear in the captured images mixed together. Provided that focus is directed on an optical flow thereamong that is a movement vector oriented toward the parking target and a moving object is detected, it is possible to prevent the detection of a moving object not requiring the awareness of the driver. In such a case, it will be appreciated that the superimposing unit 15 superimposes a display for indicating a movement trajectory of a moving object M detected on the basis of an optical flow directed toward the parking target, and therefore no unnecessary displaying will occur.

Figure 3:
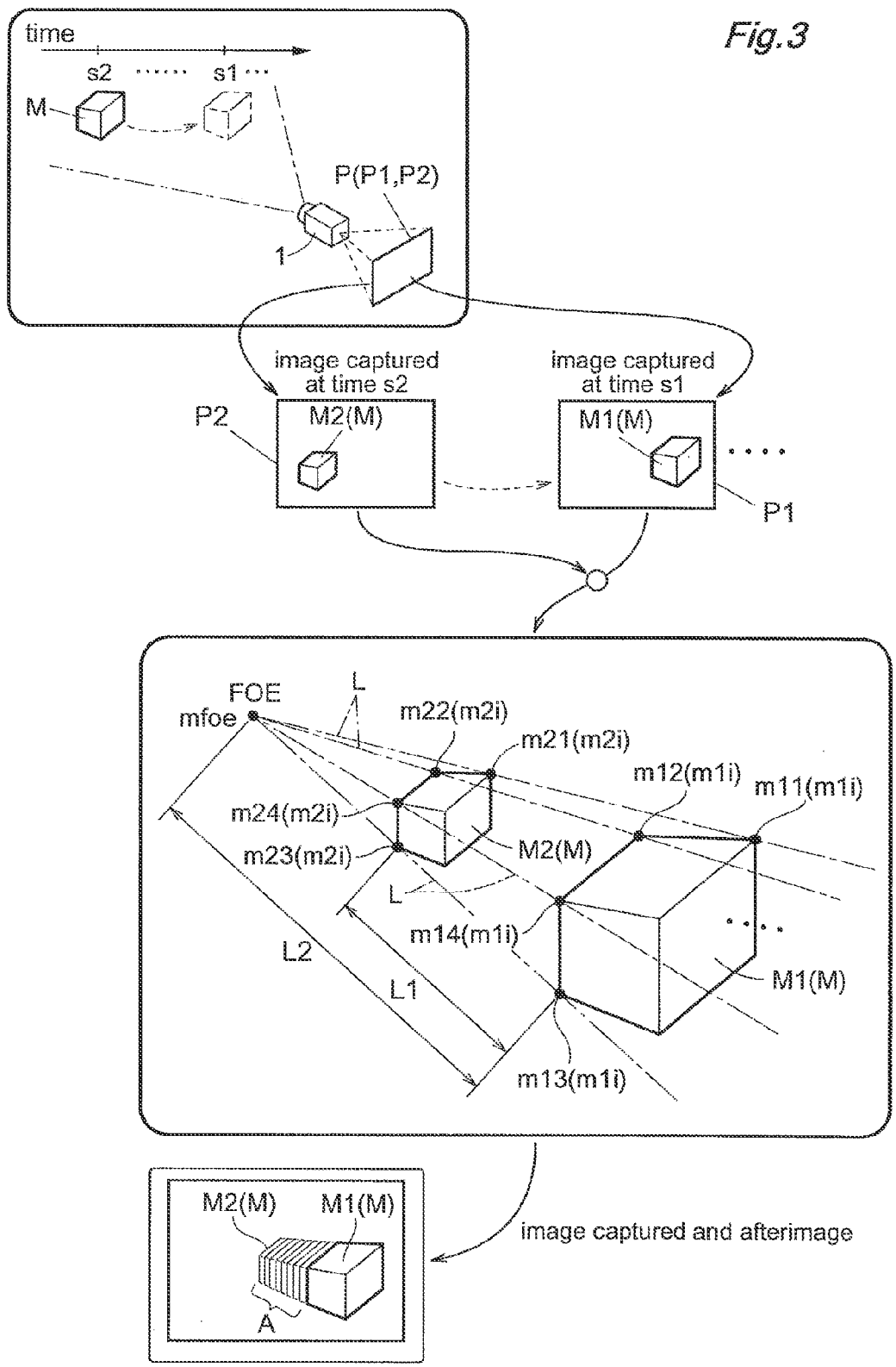
FIG. 3 is a drawing providing a description of the optical flow and the afterimage using the same.

Herein, FIG. 3 will be used to provide a description of the optical flow and the movement trajectory generated on the basis of the optical flow. Herein, to facilitate description, the moving object M is simulated using a rectangular object, and the camera 1 is fixed. As illustrated in FIG. 3, the position (coordinates) of the moving object M in a captured image (projection plane P) varies according to the positional relationship of the camera 1 with the moving object M, which is a designated object. FIG. 3 illustrates the moving object M in two images P1 and P2 taken sequentially in a case in which the moving object M has approached the camera 1. The image P1 is equivalent to a most recent captured image (frame) at a time s1, and the image P2 is equivalent to a past captured image (frame) at a time s2. Points m11 to m14 on the two-dimensional image are feature points $m1i$ ($i=1, 2, \ldots, n$) on the most recent captured image P1. Points m21 to m24 of the two-dimensional image are features points $m2i$ ($i=1, 2, \ldots, n$) on the past captured image P2. In the case of overlap between the most recent captured image P1 and the past captured image P2, a vector (movement vector) directed from a feature point $m2i$ to a feature point $m1i$ is the optical flow.

Herein, when the optical flow belonging to a single moving object M is extended, an extended straight line L intersects with one point in the focus of expansion (FOE), defined as the so-called point at infinity or vanishing point. That is, each of the feature points of the moving object M translating through three-dimensional space has a shared focus of expansion FOE on the two-dimensional image surface. It will be appreciated that each of the optical flows converges to a different focus of expansion in a case in which different moving objects exhibit translational motion not in parallel with each other. It will be readily understood that when this property is utilized, the optical flows relating to a single moving object M can be consolidated as a group. Furthermore, a group of optical flows can also be formed, with the proviso that an external ratio of an optical flow L1 to a line segment L2 ($=L1/L2$) falls within a predetermined permissible range, the line segment L2 extending between one end point (e.g. $m1i$) of the optical flow as an externally dividing point and the focus of expansion mfoe through the other end point ($m2i$) of the same optical flow.

In the description above, the camera 1 is fixed, but the vehicle 90 onto which the camera 1 is installed has a large amount of inertia. The time differences between the image data (frames) obtained sequentially are very small. Therefore, the motion of the moving object M relative to the camera coordinates can be considered to be minute translational motion that does not include a rotational component, even when the camera 1 is not fixed, i.e., even when the vehicle 90 on which the camera 1 is installed moves. Therefore, when a permissible range for permitting minute translation motion is set, the optical flows favorably converge to the focus of expansion mfoe. The optical flows may also be computed by deducting a vector component that is equivalent to such minute translational motion.

In a case in which the moving object M is sequentially tracked in a plurality of frames, the property of translation between the vehicle 90 and the moving object M is presumed to be reduced. In such a case, successively associating related optical flows makes it possible to obtain trajectories of the optical flows (the group of optical flows) for drawing a curved line. The optical flows triggered by the motion of the vehicle 90 and/or the vector components of the optical flows may be adjusted on the basis of information relating to the behavior of the vehicle 90, which is obtained from the wheel speed sensor 23, the steering sensor 21, and the like. Optical flows that are independent of the movement of the vehicle 90 can thereby be extracted.

When a group of optical flows are formed, the feature points that are the end points of the group of optical flows ($m1i$ and $m2i$) refer to points belonging to the same moving object M in each frame. In other words, it is possible to identify the pixels belonging to the same moving object M in each frame. Since the feature points are a part of the group of pixels constituting the moving object M, a predetermined range of surrounding pixels including the feature points may be identified as the pixels belonging to the same moving object M. A picture formed from the aggregation of feature points may be estimated (recognized and detected) by contour generation computation, pattern matching, or the like, and the pixels that are equivalent to the picture may be identified as the pixels belonging to the moving object M. Because the moving object M is detected by such a manner of unifying the optical flows, identifying the pixels belonging to the moving object M, and the like, such processes are executed by the moving object detection unit 13.

The afterimage generation unit 14 sets an image region containing at least a part of the pixels constituting the moving object M as a designated image region in a designated frame, which is one of the frames constituting the captured images. Then, the afterimage generation unit 14 uses the pixels of the corresponding designated image region to generate an afterimage. Specifically, the pixels of the corresponding designated image region are defined as the pixels of the afterimage at the coordinates on the corresponding frame, and the corresponding designated image region is taken out. The afterimage is given a predetermined weighting and is superimposed onto the following frame at the same coordinates as the frame from which the afterimage has been taken out (the designated frame). That is, the superimposing unit 15 superimposes the generated afterimage at the same coordinates as the coordinates of the designated image region of the designated frame in at least one frame following the designated frame, as the display for indicating the movement trajectory of the moving object M. The lowermost section of FIG. 3 illustrates an example in which an afterimage A generated from a past image is superimposed onto the most recent image P1. In the example illustrated herein, the superimposed afterimage A was generated on the basis of the images from time s2 until time s1. The following uses FIG. 4 to provide a description for the manner in which the afterimage A is generated and the manner in which the afterimage A is superimposed onto the captured image.

Figure 4:
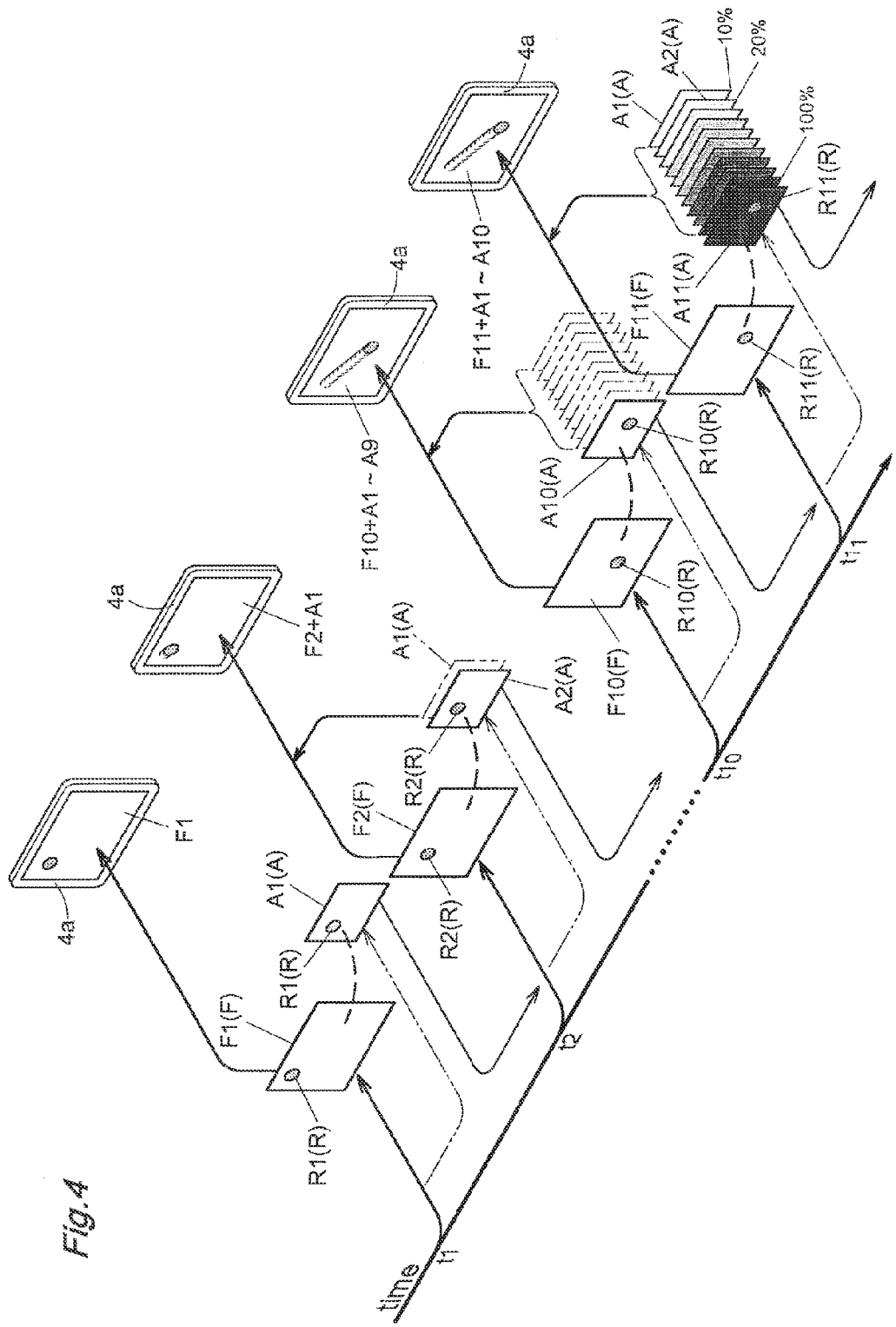
FIG. 4 is a drawing providing a description of the manner in which the afterimage is generated and superimposed on the captured image.

The reference numerals F and F1 to F11 in FIG. 4 are the frames constituting the captured images. The reference numerals A and A1 to A10 are afterimages. The reference numerals R and R1 to R10 are designated image regions including the pixels constituting the moving object M. Herein, to facilitate description, the camera 1 is described as being a digital camera for taking video at ten frames per second. Of the frames F1 to F11 of the captured images taken sequentially at the times t1 to t11, the frame F11 taken at the time t11 is the most recent frame. The frame F1 taken at the time t1 is the image taken most previously, and herein is an image taken one second prior to the frame F11. In this example, the same moving object M is correctly detected in all of the frames F1 to F11. To facilitate description, the captured images taken prior to the time t1 and the afterimages A generated from such captured images have been omitted.

The designated image region R1 relating to the moving object M detected in the frame F1 serves as the afterimage A1. The afterimage A1 is given, for example, a 10% weighting, and superimposed onto the frame F11. This weighting is a predetermined value. In this example, the farther back into the past from the frame F onto which the afterimage A is superimposed, the smaller the value of the weighting. In this example, the pixel value is multiplied by the weighting. For example, in a case in which one pixel of each color of the color image is indicated by 256 gradations and the pixel value of the remaining pixels is 200, the pixel value of the afterimage A is 20 when the weighting is 10%.

Similarly with respect to the frame F1, the designated image region R2 relating to the moving object M detected in the frame F2 serves as the afterimage A2. The afterimage A2 is given, for example, a 20% weighting, and is superimposed onto the frame F11. Thereafter, the weighting is increased in accordance with the approach of the imaging time towards the current time in the order of frames F3, F4, . . . , F10 leading to the most recent frame F11 (as the frames F are refreshed), and the generated afterimages A3, A4, . . . , A10 are superimposed onto the frame F11. To facilitate understanding, FIG. 4 illustrates an example in which the weighting is increased by 10% increments; the afterimage A10 generated from the frame F10 has a weighting of 100%.

The frames F1 to F10 are equivalent to the designated frames in which the afterimages A are generated.

The afterimages A1 to A10 of the respective frames F1 to F10 are superimposed onto the most recent frame F11, which is the frame that follows the frames F1 to F10. As illustrated in FIG. 4, the most recent frame F11 serves to indicate the actual image of the moving object M and also the movement trajectory of the moving object M over the past one second. The afterimage A11 is also generated from the most recent frame F11, on the basis of the designated image region R11 relating to the moving object M, and is superimposed onto a frame F (for example, a frame F12 (not shown)) that follows the frame F11. In a case in which the past superimposed afterimages A are in sets of ten frames, the afterimages A2 to A11 generated from the frames F2 to F11 are superimposed onto the frame F12. The weighting at this time is 10% for the oldest afterimage A2, and 100% for the newest afterimage A11.

In this manner, the afterimages A generated in order on the basis of the past frames F are superimposed onto the most recent frame F. Therefore, from another standpoint, the afterimage A1 of the frame F1 will also be superimposed onto the frames F2 to F11 that follow the frame F1. The afterimages A can therefore be said to be superimposed onto at least one frame that follows the designated frame. The weighting of an afterimage A generated from a certain frame F is not constant; it varies according to the relationship with the frame F where superimposing is to occur. For example, in a case in which the frame F2 is the most recent frame, the afterimages A generated from the ten frames prior to the frame F2 will be superimposed. Therein, the afterimage A1 generated from the frame F1 will be superimposed onto the frame F2 with a weighting of 100%. To facilitate description, this embodiment omits a depiction and description of the afterimages A generated from the captured images prior to the time t1. For example, afterimages A generated from frames taken prior to the time t1 are also superimposed onto the frame F10 taken at the time t10. However, FIG. 4 illustrates a state in which only the afterimages A1 to A9 generated from the frames F1 to F9 taken at the times t1 to t9 are superimposed. However, it will be appreciably readily understood that afterimages A generated from the past frames F will be superimposed in the frames F1 to F10 as well.

Figure 5:
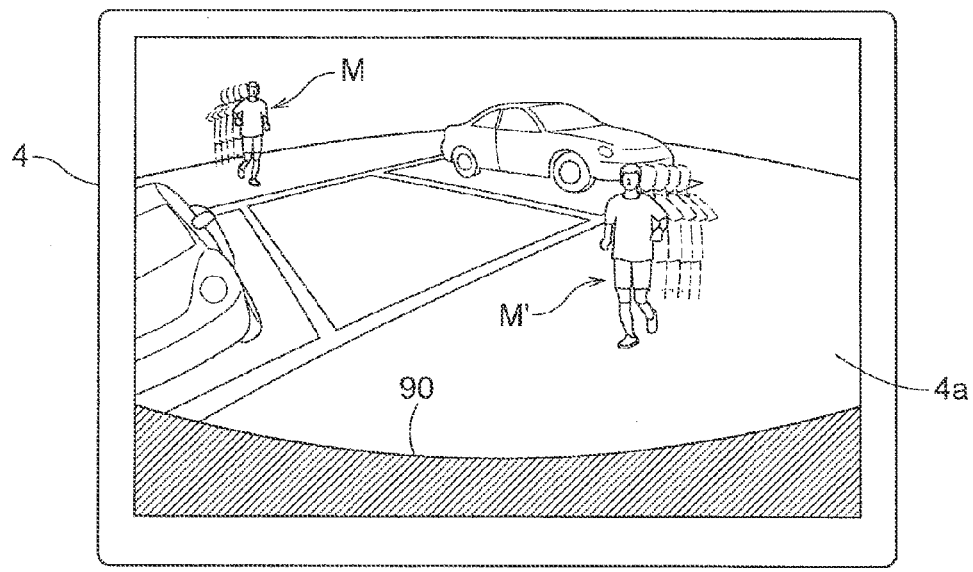
FIG. 5 is a drawing illustrating a first example of a display image onto which an afterimage is superimposed.

FIG. 5 thus illustrates an example of the manner in which the captured images onto which the afterimages A have been superimposed are displayed on the monitor device 4. As illustrated in FIG. 5, pedestrians (people in motion) serving as the moving object M (and M') are displayed along with afterimages for indicating the movement trajectory. Provided that this afterimage is a real image, it will appear in a case in which there is movement at a speed greater than the storage time or shutter speed of the digital camera. Therefore, the afterimage is rarely shown in an ordinary image, and the five senses and sixth sense of the driver can be stimulated by the creation of the afterimage. In other words, artificially making the afterimage allows for there to be provided a prompt for the driver to intuitively direct his attention to the presence and/or approach of the moving object M (and M').

Figure 6:
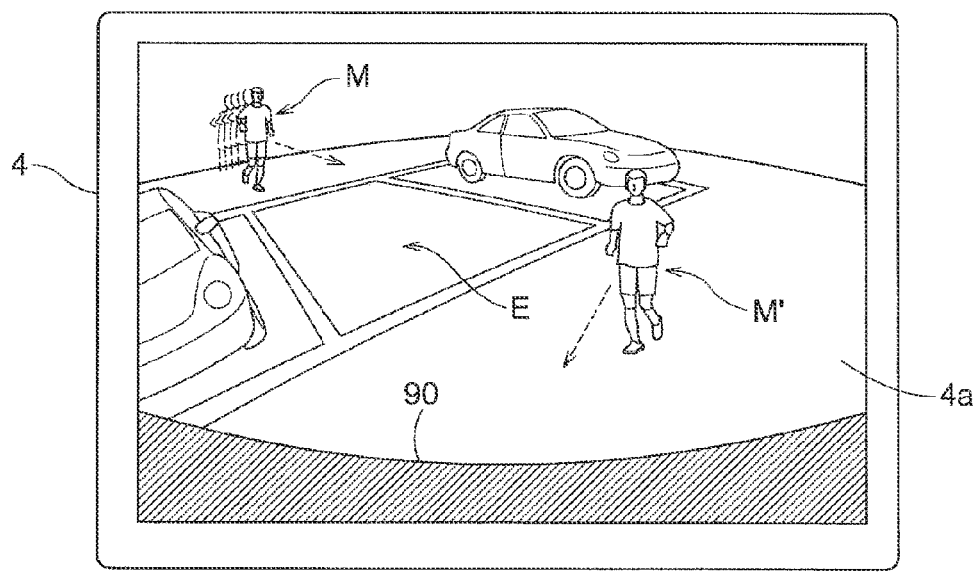
FIG. 6 is a drawing illustrating a second example of a display image onto which an afterimage is superimposed.

FIG. 6 illustrates another example of the display. As described above, in a case in which the parking target E of the vehicle 90 is clear, the moving object detection unit 13 is capable of detecting the moving object M on the basis of the optical flow directed toward the parking target E. It will be appreciated that the superimposing unit 15 superimposes the display for indicating the movement trajectory of the moving object M detected on the basis of the optical flow directed toward the parking target E, and therefore no unnecessary displaying will occur. To facilitate comparison, FIG. 6 illustrates an example of the manner in which a scene similar to that of FIG. 5 is displayed. In FIG. 6, unlike in FIG. 5, no afterimage or other display for indicating the movement trajectory is superimposed for the moving object M', which is going away from the parking target E. It will be appreciated that even in a case in which the moving object M is found within the parking target E, the moving object M is included in the concept of "directed toward the parking target" when moving within the parking target E, and an afterimage of the moving object M is superimposed.

Figure 7:
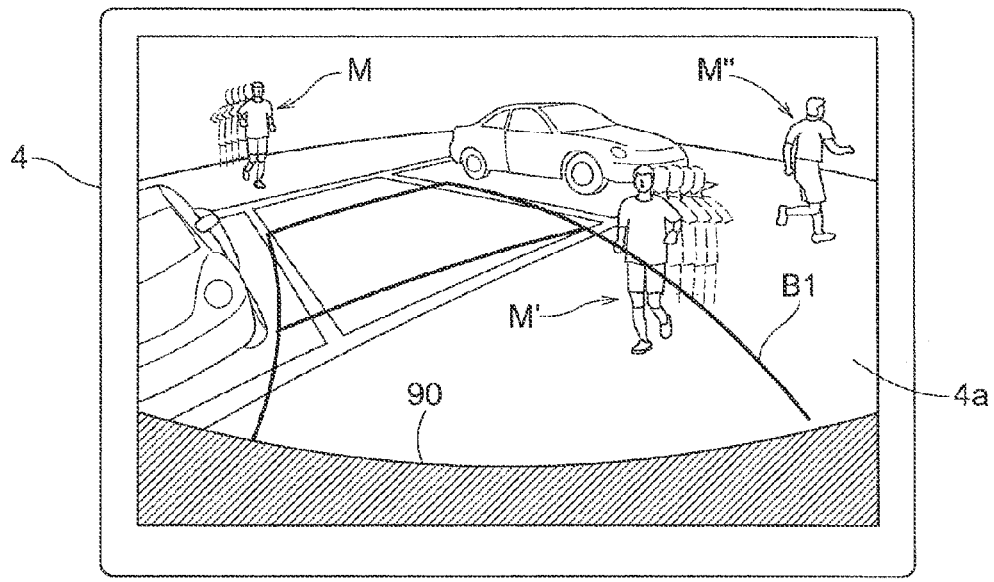
FIG. 7 is a drawing illustrating a third example of a display image onto which an afterimage is superimposed.
Figure 8:
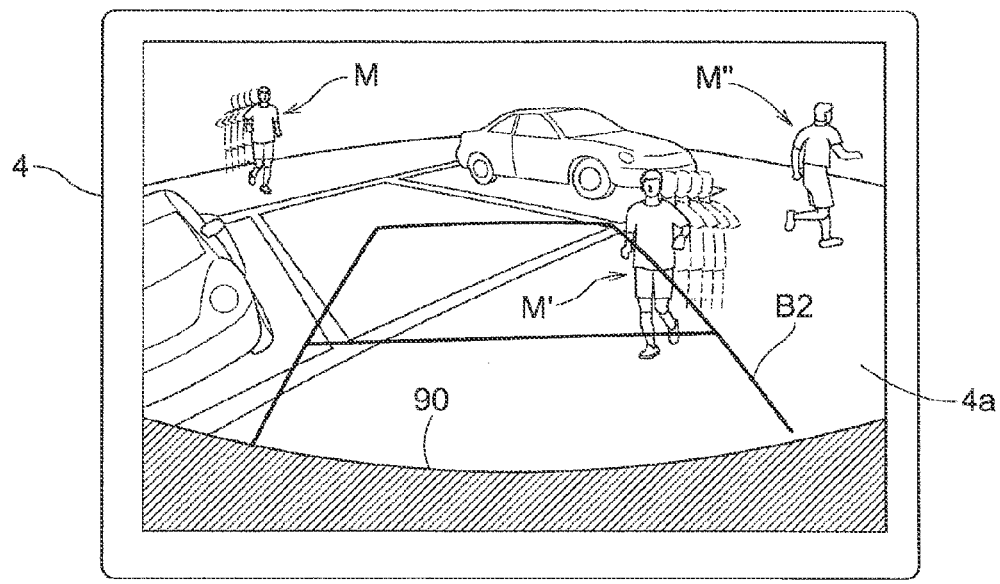
FIG. 8 is a drawing illustrating a fourth example of a display image onto which an afterimage is superimposed.

FIGS. 7 and 8 illustrate yet another example of the display. FIG. 7 is an example of a case in which the parking target of the vehicle 90 is clear and the driving support device 40 is configured such that a planned course directed toward the parking target is computed. For example, a guidance unit or course computation unit (not shown) is configured by the cooperation of the CPU 5 and the program memory 6. The reference numeral B1 in FIG. 7 illustrates a planned course line indicating a planned course, which is displayed superimposed onto the image displayed by the monitor device 4. The manner in which the planned course line B1 is drawn by the image processing module 2 or the like is publicly known and a description thereof has therefore been omitted. There exist various proposed designs for the planned course line B1; the example illustrated herein is of a simple design. It will be appreciated that the design of the planned course line B1 is not given by way of limitation to the present invention. The method for computing the planned course, which is computed in the CPU 5, is publicly known and a detailed description thereof has therefore been omitted.

In the example illustrated in FIG. 6, because the moving object M' is not directed toward the parking target E, no afterimage is superimposed, but in the example illustrated in FIG. 7, the moving object M' is approaching toward the planned course line B1, and therefore an afterimage is superimposed. It is thereby possible to provide a prompt for the driver to intuitively direct his attention to the presence and/or approach of the moving objects M and M', which are entering in on the course of the vehicle 90. A moving object M" illustrated in FIG. 7 is going away from the planned course line B1, and therefore no afterimage is superimposed. It will be appreciated that even in a case in which a moving object is found within a range surrounded by the planned course line B1, the moving object is included in the concept of "directed toward the planned course," and an afterimage of the moving object M is superimposed. This example illustrates an example of a case in which the parking target E and the planned course line B1 are set together, but the parking target E may also not be set, the planned course being computed simply by the angle of rotation of the steering wheel. Specifically, a moving object may be detected on the basis of an optical flow directed toward the planned course and a movement trajectory may be superimposed during a simple backward movement operation or the like, without limitation to movement during a parking operation.

To provide improved convenience for the driver even in a case in which the parking target E or the planned course is not clear, an extension line of the vehicle width and/or a distance guide line from the rear end of the vehicle is in some cases superimposed on the captured image as an expected course. For example, a course computation unit (not shown) is constituted of the cooperation of the CPU 5 and the program memory 6. The guide line B2 may be set depending on the positional relationship with the vehicle 90, and so the course computation unit (not shown) may be constituted of the cooperation of the CPU 5 and the program memory 6, where the image processing module 2 (in particular, the graphic drawing unit 2b) is the core. FIG. 8 illustrates an example of a display image onto which such a guide line B2 is superimposed. As illustrated in FIG. 8, merely the guide line B2 for indicating the relative relationship with the vehicle 90 is superimposed regardless of the planned course to the parking target and/or the results detected by the steering sensor 21 or the like. There is a high probability that the range of the guide line B2 may fall outside the actual course of the vehicle 90 when at a great distance, but when the vehicle 90 is nearby, the range of the guide line B2 roughly matches the course of the vehicle 90. The guide line B2 can therefore be said to indicate the expected course of the vehicle 90.

The probability that the moving object will make contact with the vehicle 90 increases with the proximity to the vehicle 90. Therefore, as illustrated in FIG. 8, the afterimage is preferably superimposed onto the moving object M', which is approaching toward the guide line B2. The guide line B2 is set relative to, for example, a level road surface by the positional relationship between the road surface and the vehicle 90; therefore, the afterimage can be readily superimposed even for a vehicle 90 onto which no advanced driving support device has been installed. Further, because the guide line B2 is drawn in a constant range relative to the vehicle 90, the computational load is also reduced. Similarly with respect to FIG. 7, the moving object M" illustrated in FIG. 8 is going away from the guide line B2, and therefore no afterimage is superimposed. However, it will be appreciated that even in a case in which a moving object is found within the range surrounded by the guide line B2, the moving object is included in the concept of "oriented toward the expected course," and an afterimage of the moving object is superimposed. It will be appreciated that this example is also not limited to movement during a parking operation; a moving object may be detected on the basis of an optical flow oriented toward the expected course and a movement trajectory may be superimposed during a simple backward movement operation or the like.

Figure 9:
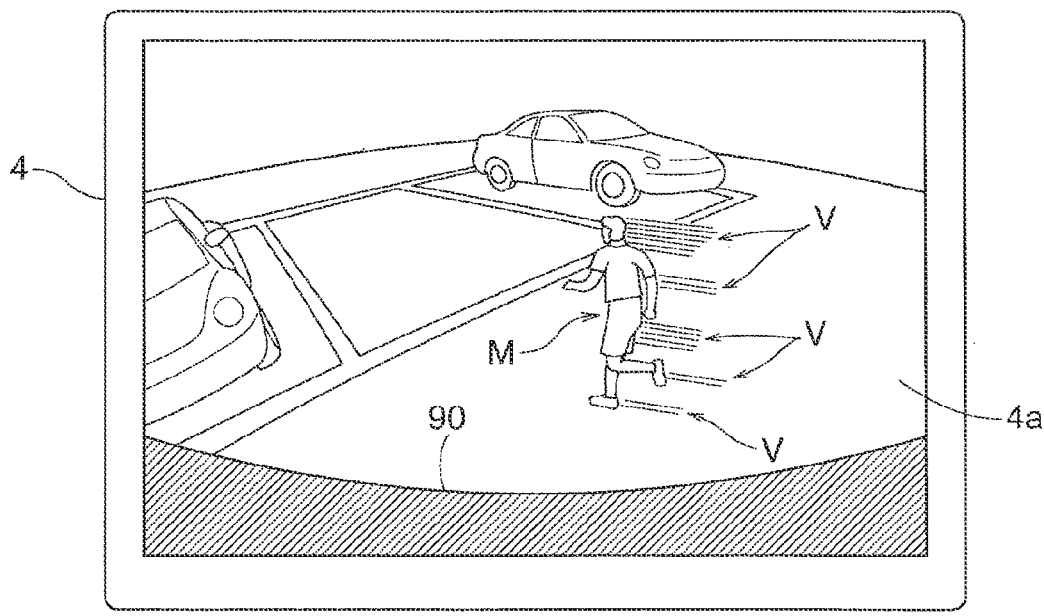
FIG. 9 is a drawing illustrating an example of a display image onto which a visualized form of the optical flow is superimposed.

FIG. 9 illustrates yet another example of the display. In this example, a visualized form of the optical flow V, rather than the afterimage, is superimposed onto the captured image. The optical flow is a movement vector in terms of computation, and does not exist as an image. Therefore, the pixels through which the optical flow passes are visualized onto the image by coloration to, for example, red or another specific color. At this time, to ensure the ability to perform a visual check, a plurality of pixels is preferably colored and visualized so as to have a predetermined width. The optical flow may be visualized by the afterimage generation unit 14, or may also be visualized by a separately provided visualization unit 17. It will also be appreciated that in each of the examples in FIGS. 5 to 8 described above, the visualized form of the optical flow V may be superimposed onto the captured image, instead of the afterimage.

A specific method for superimposing the visualized form of the optical flow V can be executed in a manner similar to that of the afterimages. Optical flows are derived in order for the optical flows computed from the frames F1 and F2 in FIG. 4, for the optical flows computed from the frames F2 and F3, . . . , and for the optical flows computed from the frames F10 and F11. Then, similarly with respect to FIG. 4, the derived optical flows are pictorially represented and superimposed onto the most recent frame F11. At this time, weighting may be given in a manner similar to that of the afterimages. The farther back into the past, the fainter the pictorial representation of the optical flow becomes; movement is therefore better represented.

As is inferred from the description above based on FIG. 3, the same feature point needs to be extracted from a plurality of images (frames) when the optical flows converge to a single focus of expansion FOE. Therefore, the optical flow of a rigid form of the moving object M having a fixed shape is more readily extracted than a soft form of the moving object M whose shape is readily changed. For this reason, in a case in which, for example, the moving object M is a human body, the moving object detection unit 13 preferably detects the moving object M by targeting the torso or other body part having a shape that is rarely deformed. At this time, no problem will be presented even when the afterimage generation unit 14 generates the afterimage using merely the pixels of the torso part, because the afterimage A is generated relative to a region accounting for a large part of the surface area of the moving object M in the image. Because there is a high probability that the moving object M is a human body during parking support and the like, contour extraction or another image processing technology may also be used to take out the pixels corresponding to the human body when the afterimage A is generated.

In view of the above, an effective outcome will be realized even when the optical flows are visualized, there being no limitation in regard to generating the afterimage A. The example of the visualized form of the optical flows illustrated in FIG. 9 is depicted without consideration for the rigidity of the human body. FIG. 9 is one example for illustrating a technical idea; the visualized form of the optical flows V may be superimposed by designating only the torso part, which is comparatively more rigid, or, as described above, another image processing technology may be used to superimpose the visualized form of the optical flows V for sites that are less rigid, such as the hands and feet.

Figure 10:
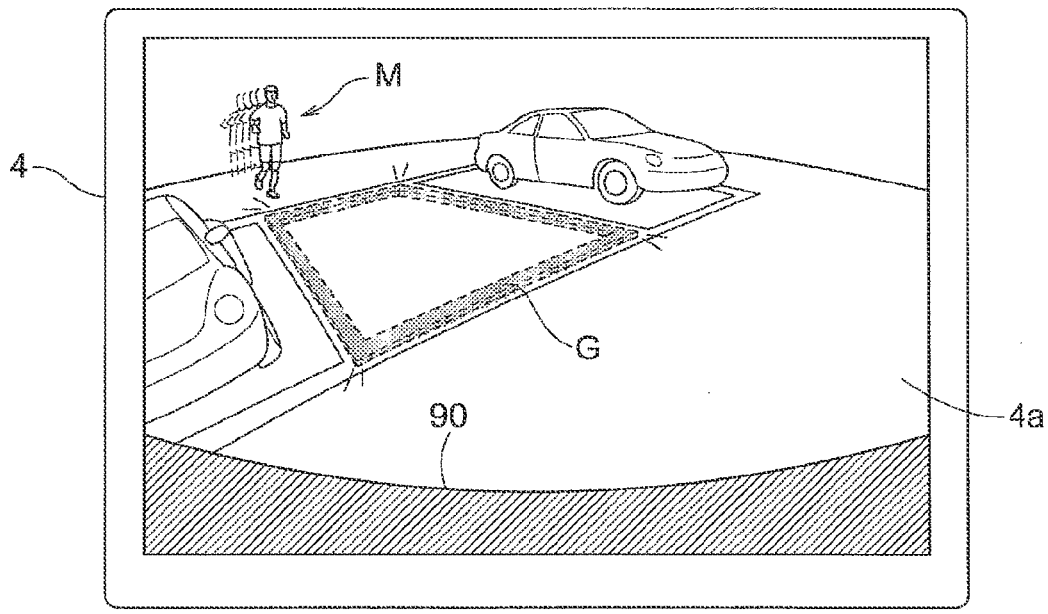
FIG. 10 is a drawing illustrating another example of a display image adapted for awareness support.

In a case in which the parking target is set, as illustrated in FIG. 10, a guide line G for indicating the parking target may additionally be superimposed, the guide line G being made to blink to attract the attention of the driver. The driver is prompted to check the surroundings by the blinking of the parking target.

INDUSTRIAL APPLICABILITY

The present invention can be applied to a vehicle surroundings awareness support capable of providing a prompt for a driver to intuitively direct their attention, without the driver feeling hassled.

REFERENCE SIGNS LIST

1 Camera (onboard camera)
10 Vehicle surroundings awareness support device
11 Image reception unit
12 Optical flow computation unit
13 Moving object detection unit
14 Afterimage generation unit
15 Superimposing unit
16 Parking target setting unit
A, A1-A11 Afterimages
E Parking target
F, F1-F11 Frames
M, M1, M2 Moving objects
R Designated image region

The invention claimed is:

1. A vehicle surroundings awareness support device comprising:
an image reception unit that receives captured images comprising a plurality of frames taken sequentially by an onboard camera for imaging the surroundings of a vehicle;
an optical flow computation unit that computes an optical flow on the basis of feature points contained in the plurality of frames imaged at different times;
a moving object detection unit that detects a moving object in the surroundings of the vehicle on the basis of the optical flow; and
a superimposing unit that superimposes a display for showing a movement trajectory for the moving object, in a direction opposite to a moving direction of the moving object, onto the captured images, on the basis of the optical flow, and further comprising:
an afterimage generation unit that sets an image region containing at least some pixels constituting the moving object as a designated image region in a designated frame, which is one of the frames constituting the captured images, and that generates an afterimage using the pixels of the designated image region,
wherein:
the superimposing unit imparts the frames following the designated frame with predetermined weightings and superimposes the afterimage thereon, the predetermined weightings being progressively decreased as the afterimage is moved away from the moving object.

2. The vehicle surroundings awareness support device according to claim 1, wherein:
the superimposing unit superimposes a visualized form of the optical flow onto the captured images.

3. The vehicle surroundings awareness support device according to claim 1, further comprising:
a parking target setting unit that sets a parking target for parking the vehicle,
wherein:
the moving object detection unit detects the moving object on the basis of the optical flow directed toward at least one of either the parking target or a planned course of the vehicle to the parking target; and
the superimposing unit superimposes a display for indicating the movement trajectory of the moving object onto the captured image.

4. The vehicle surroundings awareness support device according to claim 1, wherein:
the moving object detection unit detects the moving object on the basis of the optical flow directed toward an expected course, the course being set according to the positional relationship with the vehicle; and
the superimposing unit superimposes a display for indicating the movement trajectory of the moving object onto the captured image.

* * * * *